United States Patent
Li et al.

(10) Patent No.: US 11,644,590 B2
(45) Date of Patent: May 9, 2023

(54) MULTI-WAVEFIELD SEISMIC DETECTION METHOD AND SYSTEM BASED ON CONSTRUCTION NOISE OF SHIELD MACHINE

(71) Applicant: SHANDONG UNIVERSITY, Shandong (CN)

(72) Inventors: Shucai Li, Jinan (CN); Bin Liu, Jinan (CN); Xinji Xu, Jinan (CN); Lei Chen, Jinan (CN); Jiansen Wang, Jinan (CN); Chao Fu, Jinan (CN); Yuxiao Ren, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 113 days.

(21) Appl. No.: 17/430,545

(22) PCT Filed: Jul. 13, 2020

(86) PCT No.: PCT/CN2020/101676
§ 371 (c)(1),
(2) Date: Aug. 12, 2021

(87) PCT Pub. No.: WO2021/227236
PCT Pub. Date: Nov. 18, 2021

(65) Prior Publication Data
US 2022/0326403 A1 Oct. 13, 2022

(30) Foreign Application Priority Data
May 12, 2020 (CN) .......................... 202010397722.0

(51) Int. Cl.
G01V 1/28 (2006.01)
G01V 1/30 (2006.01)

(52) U.S. Cl.
CPC .............. *G01V 1/288* (2013.01); *G01V 1/282* (2013.01); *G01V 1/284* (2013.01); *G01V 1/305* (2013.01); *G01V 2210/1216* (2013.01)

(58) Field of Classification Search
CPC ........ G01V 1/288; G01V 1/282; G01V 1/284; G01V 1/305; G01V 2210/1216
See application file for complete search history.

(56) References Cited

U.S. PATENT DOCUMENTS

| 10,519,771 B2 | 12/2019 | Li et al. | |
| 2015/0120200 A1* | 4/2015 | Brenders | G01V 1/005 702/18 |

(Continued)

FOREIGN PATENT DOCUMENTS

| CN | 102681004 A | 9/2012 |
| CN | 102681008 A | 9/2012 |

(Continued)

OTHER PUBLICATIONS

"Experimental Study of Coal Mine Underground Seismic Technology," Basic Science Series of Full-Text Database of Ph.D. Dissertations, Apr. 15, 2020, No. 04, pp. 24-25.

(Continued)

*Primary Examiner* — Elias Desta
(74) *Attorney, Agent, or Firm* — Oliff PLC

(57) ABSTRACT

A multi-wavefield seismic detection method and system based on construction noise of a shield machine. Multi-wavefield seismic information such as a body wave and a surface wave formed during propagation of a seismic wave generated by excitation in a stratum is obtained by using noise information caused by the construction of a shield machine as a seismic source, a stratum velocity model along a tunnel is constructed through joint inversion, and reflection wave information or the like is used for migration imaging, to eventually implement relatively accurate detection of a (Continued)

geological condition in front of a tunnel face of shield construction.

10 Claims, 2 Drawing Sheets

(56) References Cited

U.S. PATENT DOCUMENTS

| | | | | |
|---|---|---|---|---|
| 2016/0238729 A1* | 8/2016 | Warner | ............... | G01V 1/364 |
| 2017/0199290 A1* | 7/2017 | Roux | ............... | G01V 1/366 |

FOREIGN PATENT DOCUMENTS

| | | |
|---|---|---|
| CN | 103713335 A | 4/2014 |
| CN | 103758511 A | 4/2014 |
| CN | 104536043 A | 4/2015 |
| CN | 104678427 A | 6/2015 |
| CN | 106772565 A | 5/2017 |
| CN | 108594299 A | 9/2018 |
| CN | 109061731 A | 12/2018 |
| KR | 10-2013-0076907 A | 7/2013 |
| WO | 2011/107955 A1 | 9/2011 |

OTHER PUBLICATIONS

Poletto et al., "Seismic interferometry with a TBM source of transmitted and reflected waves," Geophysics, 2006, vol. 71, No. 4, pp. S185-S193.
Petronio et al., "Seismic-while-drilling by using tunnel boring machine noise," Geophysics, 2002, vol. 67, No. 6, pp. 1798-1809.
Mar. 3, 2021 Office Action issued in Chinese U.S. Appl. No. 202010397722.0.
Jan. 27, 2021 International Search Report issued in International Patent Application No. PCT/CN2020/101676.
Jan. 27, 2021 Written Opinion of the International Searching Authority issued in International Patent Application No. PCT/CN2020/101676.

* cited by examiner

MULTI-WAVEFIELD SEISMIC DETECTION METHOD AND SYSTEM BASED ON CONSTRUCTION NOISE OF SHIELD MACHINE

BACKGROUND

Technical Field

The present disclosure relates to the field of shield machine seismic detection technologies, and specifically, to a multi-wavefield seismic detection method and system based on construction noise of a shield machine.

Related Art

The description in this section merely provides background information related to the present disclosure and does not necessarily constitute the prior art.

In recent years, with the rapid development of economic construction and the continuous improvement of the urbanization level, urban underground space has been developed and utilized on a large scale, and a large number of subway projects and underground comprehensive pipeline tunnel projects have been put into construction. A shield machine has become the most important construction method for urban subway tunnels due to its significant advantages such as a high mechanization degree and a high construction speed. However, the shield machine has high requirements on a geological condition in front of a tunnel face. An unexplored unfavorable geological body such as a fracture zone, a weak stratum, a boulder, or a karst cave in front of a boring face is usually a major potential safety hazard, and is highly prone to disasters and accidents such as gushing, cave-ins, cutter disk jamming, or severe wear of cutter disks, causing serious construction delays and economic losses. To avoid the occurrence of disasters and accidents during the construction by the shield machine, it is necessary to use an advanced geological prediction technology to detect an unfavorable geological condition in front of the tunnel face in advance, to provide guidance for timely formulation of appropriate contingency plans and construction plans.

Among many advanced geological prediction methods for tunnels, a seismic wave method has been widely used because of its advantages such as high interface imaging accuracy and long detection distances. However, it is found by the inventor that, existing advanced detection methods of a seismic wave of a shield tunnel are mainly carried out in tunnels. Receiving sensors are generally classified into two types: the arrangement along a side wall and the arrangement along a cutter disk. However, due to the impact of narrow observation space in tunnels, there are particular limitations:

1. A detection region is located in front of a tunnel face. If a survey line is arranged along a side wall, the arrangement is not sensitive to the detection region in front of the tunnel face, and usually can only implement accurate identification and positioning of an anomalous body in an axial direction of the tunnel but cannot adequately detect an anomalous body in an elevation direction, resulting in an error in the spatial positioning of the anomalous body, making it difficult to meet geological information requirements for safe construction of an urban subway shield tunnel.

2. There are segments in a shield tunnel, and segment assembly and a grouting construction stage behind the wall are closely connected. A seismic wave receiving sensor may be arranged in the tunnel in a small range. Available seismic data is relatively limited when observation is only performed in the tunnel.

3. If receiving sensors are arranged along a cutter disk, a small quantity of receiving sensors may be arranged on the cutter disk, the offset distance is small, and the available seismic data is limited. Reflection wave information caused by a geological anomalous body obtained when observation is only performed in a tunnel is limited, making it impossible to provide accurate results of advanced detection of a shield machine.

In summary, a shield seismic wave detection technology is limited by a tunnel environment, the obtained seismic data is limited, and the technology is only sensitive to axial information of a tunnel, but cannot provide accurate results of advanced detection, making it difficult to meet requirements for safe construction of urban shield tunnels.

SUMMARY

To resolve the foregoing problems, the present disclosure provides a multi-wavefield seismic detection method and system based on construction noise of a shield machine. In the present disclosure, multi-wavefield seismic information such as a body wave and a surface wave formed during propagation of a seismic wave generated by excitation in a stratum is obtained by using noise information caused by the construction of a shield machine as a seismic source, a stratum velocity model along a tunnel is constructed, and reflection wave information or the like in the tunnel is used for migration imaging, to eventually implement relatively accurate detection of a geological condition in front of a tunnel face of shield construction.

According to some embodiments, the present disclosure adopts the following technical solutions:

In a first aspect, the present disclosure provides a multi-wavefield seismic detection method based on construction noise of a shield machine, including: obtaining, by using construction noise caused by a shield machine as a seismic source, seismic information of a body wave field and a surface wave field formed during propagation of a seismic wave generated by excitation in a stratum, performing joint automatic processing, constructing a stratum velocity model along a tunnel, performing migration imaging by using reflection wave information in the tunnel, and determining a geological detection result in front of a tunnel face.

In the foregoing technical solution, construction noise (noise information such as vibration and sound caused by a shield machine during construction) is used as a seismic source, and multi-wavefield seismic information is collected for analysis, to resolve the existing problem of limited reflection wave information, so that accurate results of advanced detection of a shield machine can be provided.

In an optional implementation, a specific process of performing the joint automatic processing includes:

(1) obtaining surface wave information and body wave information;
(2) synchronizing received signals;
(3) determining a time record length of a valid signal;
(4) performing spectrum analysis, bandpass filtering, gather balance, valid reflection wave extraction, and longitudinal and transverse wave separation;
(5) importing surface wave data and reflection wave data after signal extraction for the joint inversion; and
(6) importing, by using a velocity model obtained through the joint inversion, valid reflection wave data after the valid signal is extracted, and obtaining a seismic profile of an anomalous body in front of a working face of the shield machine in the tunnel based on a cross-correlation imaging condition by using reverse-time migration imaging.

As a further limitation, step (5) specifically includes:

(5-1) surface wave inversion: extracting dispersion data of a surface wave through the surface wave data, constructing a two-dimensional phase velocity or group velocity model of a soil body below the surface by using a travel time imaging method based on a ray theory, correcting the dispersion data of the surface wave in a case of the given phase velocity or group velocity model and noise azimuth distribution by using plane wave simulation, obtaining an S-wave velocity structure by performing one-dimensional linear or non-linear inversion on each grid point on the two-dimensional phase velocity or group velocity model by using a characteristic that surface wave dispersion is mainly sensitive to S-wave velocity, and combining all one-dimensional S-wave velocity structures to form a three-dimensional velocity model; and (5-2) reflection wave constrained inversion based on a priori information of the surface wave: applying a smooth constraint based on a conventional reflection wave inversion method, and applying a wave velocity result of the surface wave inversion as an a priori constraint to reflection wave inversion, to obtain a joint inversion velocity model.

In an optional implementation, the velocity model is:

$$\varphi = [(d_{obs}-d_{m0})-A(m-m_0)]^T[(d_{obs}-d_{m0})-A(m-m_0)] + \lambda [C(m-m_0)]^T[C(m-m_0)] + \eta[F(m-m_0)] \ m_i^{min} \leq m_i \leq m_i^{max} \ i=1,2,\ldots,N$$

where m is a model parameter, $d_{obs}$ is observation data, N is the number of inversion grid cells, $m_0$ is a model parameter obtained by the last inversion, $d_{m0}$ is theoretical observation data obtained by forward modeling when a model parameter is $m_0$, A is a sensitivity matrix, C is a smoothness matrix, $\lambda$ is a Lagrange constant, which controls a weight of the smooth constraint, $m_i$ is a model parameter of an $i^{th}$ grid point, $m_i^{min}$ and $m_i^{max}$ are respectively the minimum and maximum values of the model parameter, $\eta$ controls a weight of an a priori constraint of the surface wave, and F is a surface wave velocity constraint matrix.

In a second aspect, the present disclosure provides a multi-wavefield seismic detection system based on construction noise of a shield machine, including: a tunnel receiving station array, a surface receiving station array, and a seismic wave data processing module, where the tunnel receiving station array is disposed on a body of a shield machine, and is configured to receive and store a seismic signal reflected to a tunnel wall after an unfavorable geological body is encountered during propagation of vibration of a shield machine during construction in a stratum;

the surface receiving station array is disposed on an upper surface of the tunnel and a front of a working face, and is configured to receive and store a body wave seismic signal that is reflected to the surface and a surface wave seismic signal that propagates in the stratum after an unfavorable geological body is encountered during propagation of vibration of a shield machine during construction in a stratum; and the seismic wave data processing module is configured to jointly process seismic information collected from a tunnel and the surface to obtain a velocity model and seismic profile of a region in front of and around the tunnel.

It should be noted that, in the art, a receiving station array includes a plurality of rows of receiving stations, and a case of only one row of receiving stations exists.

In an optional implementation, a tunnel receiving station is fixed to a middle portion of a body of the shield machine by a mounting mechanism, and specifically includes a three-component receiving station, a telescopic support rod, a first drive mechanism, a second drive mechanism, a receiving station support frame, and a station rail system, the three-component receiving station is connected to one end of the telescopic support rod, the other end of the telescopic support rod is rotatably disposed on the receiving station support frame, the receiving station support frame is slidably disposed on the station rail system, the first drive mechanism is configured to drive the receiving station support frame to move along the station rail system, the station rail system is fixed to the shield machine, and the second drive mechanism is configured to drive the telescopic support rod to rotate.

In an optional implementation, the tunnel receiving station array includes two groups of tunnel receiving stations, each group includes a plurality of tunnel receiving stations distributed side by side, the two groups are located on two sides of the shield machine at a set distance from a cutter disk, and there is a particular distance between the two groups.

In an optional implementation, the surface receiving station array includes a plurality of receiving stations, and the plurality of receiving stations are arranged on the surface on a travel route of the shield machine in the form of a rectangular array.

Certainly, buildings and roads need to be avoided during arrangement.

In an optional implementation, each receiving station is provided with a built-in battery and a positioning system, so that long-term collection and station location acquisition can be implemented.

In a third aspect, a working method based on the foregoing system is provided, including the following steps:

(1) arranging observation methods for a tunnel and a surface;

(2) collecting and storing, by each receiving station, signals when the shield machine is working, and importing collected data into the seismic wave data processing module after data collection is completed;

(3) performing, by the seismic wave data processing module, joint automatic processing on information collected from the tunnel and the surface to obtain a velocity model and seismic profile of a region in front of and around the tunnel;

(4) restoring, by the tunnel receiving station array, an initial state when the excavation of the shield machine enters a next cycle, reserving the surface receiving station array, and when the shield machine is working again, rearranging the tunnel receiving station array to repeat steps (2) and (3); and (5) learning a geological condition of a soil body in front of a working face of the shield machine and around the tunnel according to the obtained velocity model and seismic profile, to implement advanced prediction of a geological anomalous body.

In an optional implementation, in step (1), before detection, the tunnel receiving station is driven to move to an end close to a tunnel segment to identify a segment grouting hole, and the tunnel receiving station is driven to move to the position of the grouting hole to enable the tunnel receiving station to be tightly coupled to the soil body.

In an optional implementation, in step (1), before detection, the surface receiving station array is arranged on an upper surface of the shield machine and an upper surface in front of the working face, and surface receiving stations in a rectangular array are arranged with a particular track spacing and a particular lateral offset distance, to implement three-dimensional observation of the surface, where buildings and roads need to be avoided during arrangement.

In an optional implementation, in step (2), vibration occurs during the construction of the shield machine, the vibration from the construction excites a seismic wave to enable the seismic wave to spread in front of the working face of the shield machine and around the tunnel, the seismic wave is reflected after encountering an anomalous body, and is received by the tunnel receiving station in close contact with the soil body in the tunnel and the surface receiving station, a generated surface wave is also received by the surface receiving station, and the tunnel receiving station array and the surface receiving station array automatically store received seismic signals.

In step (4), after the detection is completed, the telescopic support rod is retracted, so that the tunnel receiving station is no longer in contact with the soil body, the tunnel receiving station is rotated to an end away from the segment, the surface receiving station array remains unchanged, before the construction of the shield machine starts a next time, the rapid arrangement of the tunnel receiving station array is implemented, to implement repeated coverage and detection of the soil body in front of the working face of the shield machine and around the tunnel, thereby improving the detection accuracy, and the surface receiving station array is rearranged when the offset distance of the surface receiving station array no longer meets the detection requirements along with the excavation of the shield machine.

Compared with the prior art, the present disclosure has the following beneficial effects:

(1) In the present disclosure, construction noise of a shield machine is used for advanced geological detection, and the tunnel receiving station array and the surface receiving station array synchronously receive a seismic wave field signal generated from the vibration of the shield machine during construction in the tunnel, thereby alleviating the problem that observable data in such an existing tunnel environment is greatly limited and as a result accurate detection cannot be implemented.

(2) The present disclosure provides a specific process of processing multi-wavefield seismic detection data based on construction noise of a shield machine, joint constrained inversion is performed by using multi-wavefield information of a surface wave and a reflection wave to accurately construct a shallow urban velocity model.

(3) In the present disclosure, collected received data of a surface and a tunnel includes both horizontal direction information and elevation direction information of an unfavorable geological body. The reverse-time migration imaging is performed by using the reflection wave information, so that the unfavorable geological body can be accurately positioned in space and provide guidance for the excavation and construction of the shield machine.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "include" and/or "include" used in this specification indicate that there are features, steps, operations, devices, components, and/or combinations thereof.

In the present disclosure, orientation or position relationships indicated by the terms such as "upper", "lower", "left", "right" "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure.

In the present disclosure, terms such as "fixedly connected", "interconnection", and "connection" should be understood in a broad sense. The connection may be a fixing connection, an integral connection or a detachable connection; or the connection may be a direct connection, or an indirect connection by using an intermediary. Relevant scientific research or technical personnel in the art may determine the specific meanings of the foregoing terms in the present disclosure according to specific situations, and such terms should not be construed as a limitation on the present disclosure.

Figure 1:
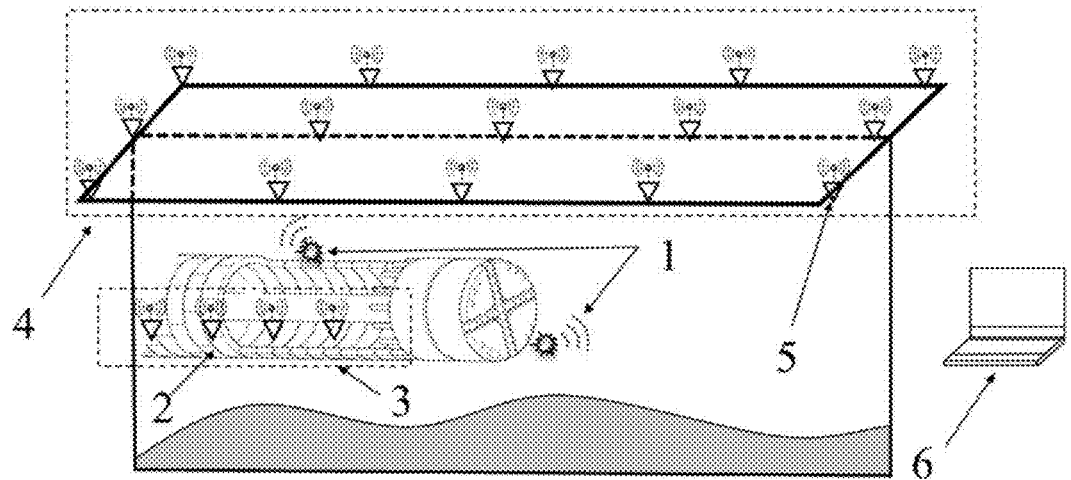
FIG. 1 is a schematic diagram of an observation method for multi-wavefield seismic detection based on construction noise of a shield machine.

As shown in FIG. 1, a multi-wavefield seismic detection apparatus based on construction noise of a shield machine mainly includes a tunnel receiving station array and a fixing apparatus 3 thereof, a surface receiving station array 4, and a seismic wave data processing module 6.

It should be understood that the receiving station in the present disclosure is a receiving station in the detection field, and a corresponding receiving device such as a wave detector or a sensor is disposed in the receiving station. The receiving station is a conventional technical term in the art.

Figure 2:
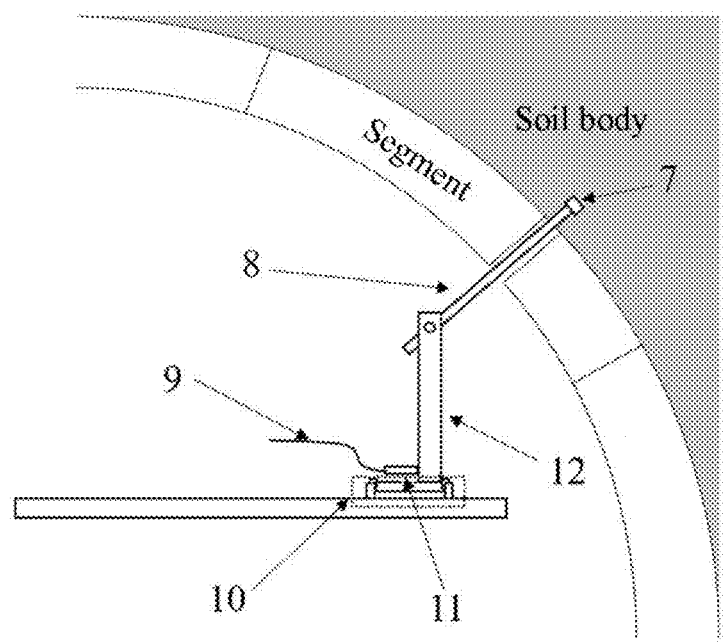
FIG. 2 is a schematic diagram of a tunnel receiving station and a fixing apparatus thereof.

As shown in FIG. 2, the tunnel receiving station array and the fixing apparatus 3 thereof are mounted in a middle portion of a shield machine. In this embodiment, the tunnel receiving station array is formed by 10 tunnel receiving stations located on two sides of the shield machine. The tunnel receiving station array with a track spacing of 3 m is disposed at a position of 10 m behind a cutter disk 1.

Certainly, in other embodiments, the number of the receiving stations of the tunnel receiving station array may be adjusted according to a specific construction condition, construction environment, and other factors.

Similarly, an arrangement distance (that is, the distance from the cutter disk) and the track spacing of the tunnel receiving station array may also be adjusted according to the specific construction condition, construction environment, and other factors. For example, in other embodiments, distribution with unequal distances may be used. Details are not described herein again.

Specifically, each tunnel receiving station is formed by a three-component receiving station 7, a telescopic support rod 8, a cable 9, a receiving station support frame 12, a drive shaft 11, a station rail system 10, and the like. The three-component receiving station 7 is connected to the telescopic support rod 8. In this embodiment, the telescopic support rod 8 is rotatably connected to the receiving station support frame 12 by a rotating shaft, and the receiving station support frame 12 is slidably fixed on the station rail system 10.

In this embodiment, the drive mechanism is an electric mechanism. An external power device is connected to the receiving station support frame 12 by the cable 9 and the drive shaft 11, the receiving station support frame 12 is driven to move along the station rail system 10, and the station rail system 10 is fixed to the shield machine.

The three-component receiving station 7 has at least three degrees of freedom such as retraction, pitching, and horizontal movement by using a telescopic, rotatable, and overall movable characteristics of the telescopic support rod.

Certainly, this embodiment only provides a power-driven mechanism. In other embodiments, another drive method such as oil hydraulic drive may be used instead. These are only variant forms readily figured out by a person skilled in the art, and should belong to the protection scope of the present disclosure.

The surface receiving station array 4 is mounted on the upper surface of the tunnel and the upper surface in front of the working face. In this embodiment, 100 surface receiving stations 5 are arranged in a rectangle to form the surface receiving station array 4, which is configured to receive and store a seismic signal that is reflected to the surface after an unfavorable geological body is encountered during propagation of the rock breaking vibration of the cutter disk in the stratum, to implement three-dimensional observation of the surface.

Certainly, in other embodiments, the number of the receiving stations of the surface receiving station array may be adjusted according to a specific construction condition, construction environment, and other factors. The formed matrix may alternatively have another regular or irregular pattern, for example, a rhombus and a trapezoid. Details are not described herein again.

The seismic wave data processing module 6 communicates with each receiving station. Certainly, a communication method may be wired or wireless. Seismic data received and stored by the receiving station in the tunnel, the surface receiving station, and the noise receiving station is imported to implement rapid and automatic processing.

Figure 3:
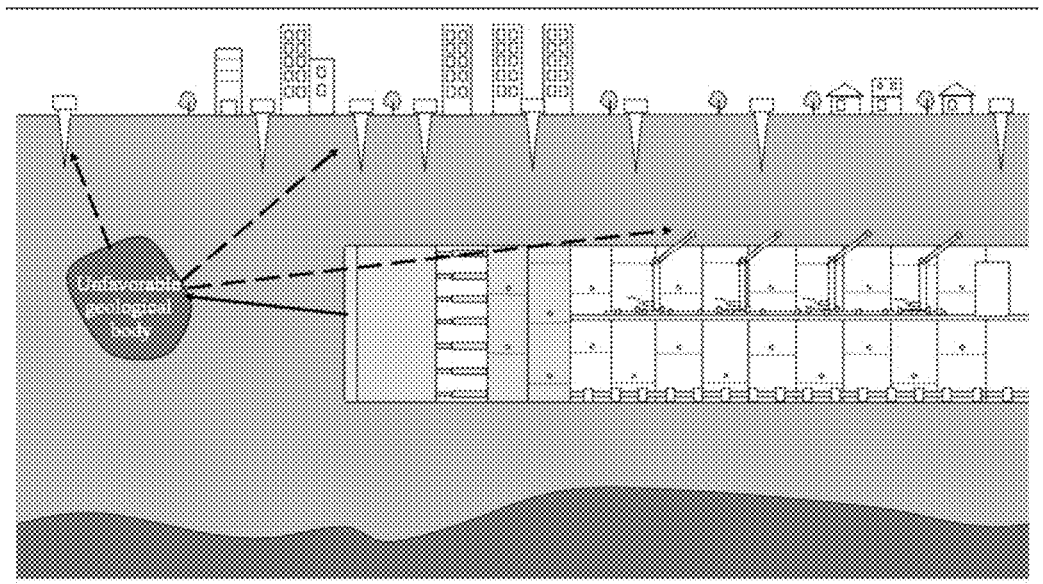
FIG. 3 is a schematic diagram of a working principle of multi-wavefield seismic detection based on construction noise of a shield machine.

As shown in FIG. 3, first, before detection, the tunnel receiving station is controlled to rotate the three-component receiving station 7 to an end of a tunnel segment 2. The three-component receiving station 7 is provided with an image identification system to automatically identify a segment grouting hole. The station rail system 10 is controlled to move the three-component receiving station 7 to the position of the grouting hole. The telescopic support rod 8 extends the support rod through the segment grouting hole to enable the three-component receiving station 7 to be tightly coupled to a soil body, and the tunnel receiving station is provided with an automatic positioning system to automatically store its spatial location.

Before detection, the surface receiving station array 4 is arranged on an upper surface of the shield machine and an upper surface in front of the working face, and surface receiving stations in a square array are rapidly arranged with a track spacing of 10 m and a lateral offset distance of 10 m, to implement three-dimensional observation of the surface, buildings and roads need to be avoided during arrangement, and the surface receiving station is provided with an automatic positioning system to automatically store a location.

In other embodiments, the values of the track spacing and the lateral offset distance of the surface receiving station array may be changed according to the specific surface condition and construction condition.

Next, the shield machine is working. While the cutter disk 1 continuously excavates the working face, the cutter disk 1 and the shield machine also move forward slowly. Therefore, the telescopic support rod 8 is retracted along with every movement, so that the three-component receiving station 7 is no longer in contact with the soil body. Before excavation a next time, the three-component receiving station 7 moves to a next segment grouting hole through the station rail system 10, and the telescopic support rod 8 extends the support rod to enable the three-component receiving station 7 to be tightly coupled to the soil body and keep the relative position of the three-component receiving station 7 and the cutter disk 1 unchanged.

On the other hand, vibration occurs during the construction of the shield machine, the vibration from the construction excites a seismic wave to enable the seismic wave to spread in front of the working face of the shield machine and around the tunnel, the seismic wave is reflected after encountering an anomalous body, and is received and stored by the tunnel receiving station 6 in close contact with the soil body in the tunnel. In this case, the reflected seismic wave and a surface wave are received and stored by the surface receiving station array 4 in close contact with the surface. The information recorded by the tunnel receiving station and the surface receiving station is transmitted to the seismic wave data processing module for joint processing.

Figure 4:
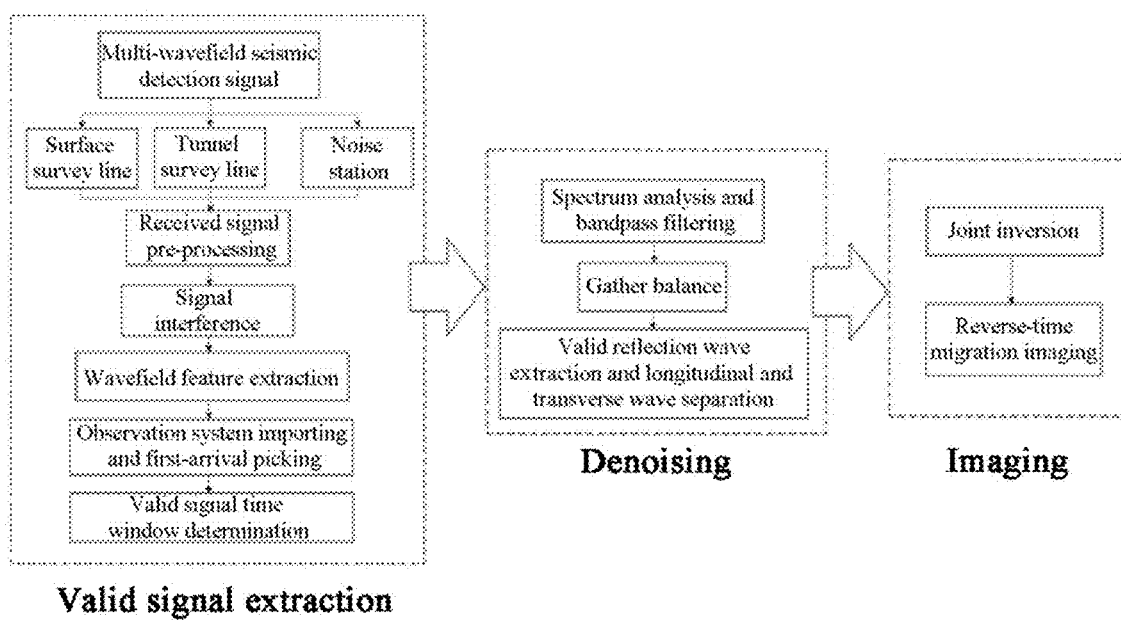
FIG. 4 is a flowchart of processing multi-wavefield seismic detection data based on construction noise of a shield machine.

As shown in FIG. 4, a data processing procedure includes the following steps:

1. Obtain surface wave information and body wave information: The data received and stored by the surface receiving station is cross-correlated and autocorrelated to obtain the surface wave information and body wave information, and the data includes elevation direction information of an unfavorable geological body. The data received and stored by the tunnel receiving station and the data received and stored by the surface receiving station are cross-correlated to obtain the body wave information, and the data includes horizontal direction information of the unfavorable geological body.

2. Synchronize received signals: The relative coordinates of the tunnel receiving station array and the surface receiving station array are imported, moments at which a first-arrival wave reaches each tunnel wave detector and each surface wave detector in the seismic record are picked up by using an automatic first-arrival picking method, and the data of the tunnel receiving station array and the data of the surface receiving station array are synchronized by using the relative distance and the moment at which the first-arrival wave reaches the wave detector.

3. Determine a time record length of a valid signal: A reflection wave moment of a bedrock surface in the seismic record is calculated by using a given relative position of the bedrock surface and an observation system, and a length from the first-arrival wave moment to the reflection wave moment of the bedrock surface is a time record length of valid seismic data.

4. Denoising: The denoising includes spectrum analysis, bandpass filtering, gather balance, valid reflection wave extraction, and longitudinal and transverse wave separation.

5. Joint inversion: Surface wave data and the reflection wave data after denoising are imported for joint inversion.

5.1. Surface wave inversion: Dispersion data of a surface wave is extracted through the surface wave data, a two-dimensional phase velocity or group velocity model of the soil body below the surface is constructed by using a travel time imaging method based on a ray theory, the dispersion data of the surface wave is corrected in a case of the given phase velocity or group velocity model and noise azimuth distribution by using plane wave simulation, to improve the reliability of imaging results of the surface wave, an S-wave velocity structure is obtained by performing one-dimensional linear or nonlinear inversion on each grid point on the two-dimensional phase velocity or group velocity model by using a characteristic that surface wave dispersion is mainly sensitive to S-wave velocity, and all one-dimensional S-wave velocity structures are then combined to form a three-dimensional velocity model.

5.2. Reflection wave constrained inversion based on a priori information of the surface wave: A smooth constraint is applied based on a conventional reflection wave inversion method to minimize a wave velocity difference between adjacent grid cells, and a wave velocity result of the surface wave inversion is applied as an a priori constraint to reflection wave inversion to further suppress the non-uniqueness of inversion results and implement the joint inversion of multi-wavefield seismic data, to eventually obtain a joint inversion velocity model.

As a further limitation, the velocity model is:

$$\varphi = [(d_{obs} - d_{m0}) - A(m - m_0)]^T [(d_{obs} - d_{m0}) - A(m - m_0)] + \lambda [C(m - m_0)]^T [C(m - m_0)] + \eta [F(m - m_0)]^T [F(m - m_0)]$$
$$m_i^{min} \leq m_i \leq m_i^{max} \quad i = 1, 2, \ldots, N$$

where m is a model parameter, $d_{obs}$ is observation data, N is the number of inversion grid cells, $m_0$ is a model parameter obtained by the last inversion, $d_{m0}$ is theoretical observation data obtained by forward modeling when a model parameter is $m_0$, A is a sensitivity matrix, C is a smoothness matrix, $\lambda$ is a Lagrange constant, which controls a weight of the smooth constraint, m is a model parameter of an $i^{th}$ grid point, $m_i^{min}$ and $m_i^{max}$ are respectively the minimum and maximum values of the model parameter, $\eta$ controls a weight of an a priori constraint of the surface wave, and F is a surface wave velocity constraint matrix.

6. Reverse-time migration imaging: Valid reflection wave data after the valid signal is extracted is imported by using a velocity model obtained through the joint inversion, and a seismic profile of an anomalous body such as a boulder and karst in front of a working face of the shield machine in the tunnel is obtained by using a cross-correlation imaging condition and reverse-time migration imaging.

After the detection is completed, the telescopic support rod 8 is retracted, so that the three-component receiving station 7 is no longer in contact with the soil body, the three-component receiving station 7 is rotated to an end away from the segment 2, the surface receiving station array 4 remains unchanged, before excavation starts a next time, the rapid arrangement of the tunnel receiving station array 3 is implemented, to implement repeated coverage and detection of the soil body in front of the working face of the shield machine and around the tunnel, thereby improving the detection accuracy, and the surface receiving station array 4 is rearranged when the offset distance of the surface receiving station array 4 no longer meets the detection requirements along with the excavation of the shield machine.

A geological condition of the soil body in front of a working face of the shield machine and around the tunnel are learned according to the obtained velocity model and seismic profile, to implement advanced prediction of a geological anomalous body such as a boulder and a karst cave, to provide reference for safe construction of the shield machine.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A multi-wavefield seismic detection method based on construction noise of a shield machine, comprising:
    obtaining, by using construction noise caused by a shield machine as a seismic source, seismic information of a body wave field and a surface wave field formed during propagation of a seismic wave generated by excitation in a stratum;
    performing joint automatic processing, constructing a stratum velocity model along a tunnel through joint inversion;
    performing migration imaging by using reflection wave information; and
    determining a geological detection result in front of a tunnel face.

2. The multi-wavefield seismic detection method based on construction noise of a shield machine according to claim 1, wherein a specific process of performing the joint automatic processing comprises:
    (1) obtaining surface wave information and body wave information;
    (2) synchronizing received signals;
    (3) determining a time record length of a valid signal;

(4) performing spectrum analysis, bandpass filtering, gather balance, valid reflection wave extraction, and longitudinal and transverse wave separation;
(5) importing surface wave data and reflection wave data after signal extraction for the joint inversion; and
(6) importing, by using a velocity model obtained through the joint inversion, valid reflection wave data after the valid signal is extracted; and obtaining a seismic profile of an anomalous body in front of a working face of the shield machine in the tunnel based on a cross-correlation imaging condition by using reverse-time migration imaging.

3. The multi-wavefield seismic detection method based on construction noise of a shield machine according to claim 2, wherein step (5) specifically comprises:
(5-1) surface wave inversion:
extracting dispersion data of a surface wave through the surface wave data;
constructing a two-dimensional phase velocity or group velocity model of a soil body below the surface by using a travel time imaging method based on a ray theory;
correcting the dispersion data of the surface wave in a case of the given phase velocity or group velocity model and noise azimuth distribution by using plane wave simulation;
obtaining an S-wave velocity structure by performing one-dimensional linear or nonlinear inversion on each grid point on the two-dimensional phase velocity or group velocity model by using a characteristic that surface wave dispersion is mainly sensitive to S-wave velocity;
and, combining all one-dimensional S-wave velocity structures to form a three-dimensional velocity model; and
(5-2) reflection wave constrained inversion based on a priori information of the surface wave:
applying a smooth constraint based on a conventional reflection wave inversion method;
and applying a wave velocity result of the surface wave inversion as an a priori constraint to reflection wave inversion, to obtain a joint inversion velocity model.

4. A working method of the system according to claim 1, comprising the following steps:
(1) arranging observation methods for a tunnel and a surface;
(2) collecting and storing, by each receiving station, signals when the shield machine is working; and, importing collected data into the seismic wave data processing module after data collection is completed;
(3) performing, by the seismic wave data processing module, joint automatic processing on information collected from the tunnel and the surface to obtain a velocity model and seismic profile of a region in front of and around the tunnel;
(4) restoring, by the tunnel receiving station array, an initial state when the excavation of the shield machine enters a next cycle; reserving the surface receiving station array; and when the shield machine is working again, rearranging the tunnel receiving station array to repeat steps (2) and (3); and
(5) learning a geological condition of a soil body in front of a working face of the shield machine and around the tunnel according to the obtained velocity model and seismic profile, to implement advanced prediction of a geological anomalous body.

5. The working method according to claim 4, wherein in step (1), before detection, the tunnel receiving station is driven to move to an end close to a tunnel segment to identify a segment grouting hole; and the tunnel receiving station is driven to move to the position of the grouting hole to enable the tunnel receiving station to be tightly coupled to the soil body; or
in step (1), before detection, the surface receiving station array is arranged on an upper surface of the shield machine and an upper surface in front of the working face; and surface receiving stations in a rectangular array are arranged with a particular track spacing and a particular lateral offset distance, to implement three-dimensional observation of the surface.

6. The working method according to claim 4, wherein in step (2), vibration occurs during the construction of the shield machine, the vibration from the construction excites a seismic wave to enable the seismic wave to spread in front of the working face of the shield machine and around the tunnel; the seismic wave is reflected after encountering an anomalous body, and is received by the tunnel receiving station in close contact with the soil body in the tunnel and the surface receiving station; a generated surface wave is also received by the surface receiving station; and the tunnel receiving station array and the surface receiving station array automatically store received seismic signals; or
after the detection is completed, the telescopic support rod is retracted, so that the tunnel receiving station is no longer in contact with the soil body; the tunnel receiving station is rotated to an end away from the segment, the surface receiving station array remains unchanged; before the construction of the shield machine starts a next time, the rapid arrangement of the tunnel receiving station array is implemented; and the surface receiving station array is rearranged when the offset distance of the surface receiving station array no longer meets the detection requirements along with the excavation of the shield machine.

7. A multi-wavefield seismic detection system based on construction noise of a shield machine, comprising: a tunnel receiving station array, a surface receiving station array, and a seismic wave data processing module, wherein
the tunnel receiving station array is configured to receive and store a seismic signal reflected to a tunnel wall after an unfavorable geological body is encountered during propagation of vibration of a shield machine during construction in a stratum;
the surface receiving station array is configured to receive and store a body wave seismic signal that is reflected to the surface and a surface wave seismic signal that propagates in the stratum after an unfavorable geological body is encountered during propagation of vibration of a shield machine during construction in a stratum; and
the seismic wave data processing module is configured to jointly process seismic information collected from a tunnel and the surface to obtain a velocity model and seismic profile of a region in front of and around the tunnel.

8. The multi-wavefield seismic detection system based on construction noise of a shield machine according to claim 7, wherein a tunnel receiving station is fixed to a middle portion of a body of the shield machine by a mounting mechanism, and specifically comprises a three-component receiving station, a telescopic support rod, a first drive mechanism, a second drive mechanism, a receiving station support frame, and a station rail system, the three-component receiving station is connected to one end of the telescopic support rod, the other end of the telescopic support rod is rotatably disposed on the receiving station support frame, the receiving station support frame is slidably disposed on the station rail system, the first drive mechanism is configured to drive the receiving station support frame to move along the station rail system, the station rail system is fixed to the shield machine, and the second drive mechanism is configured to drive the telescopic support rod to rotate.

9. The multi-wavefield seismic detection system based on construction noise of a shield machine according to claim 7, wherein the tunnel receiving station array comprises two groups of tunnel receiving stations, each group comprises a plurality of tunnel receiving stations distributed side by side, the two groups are located on two sides of the shield machine at a set distance from a cutter disk, and there is a particular distance between the two groups.

10. The multi-wavefield seismic detection system based on construction noise of a shield machine according to claim 7, wherein the surface receiving station array comprises a plurality of receiving stations, and the plurality of receiving stations are arranged on the surface on a travel route of the shield machine in the form of a rectangular array.

\* \* \* \* \*